United States Patent
Lahr et al.

(10) Patent No.: US 6,297,566 B1
(45) Date of Patent: Oct. 2, 2001

(54) TRANSFER CASE ENGAGEMENT AND DISENGAGEMENT SYSTEM

(75) Inventors: Jeremy A. Lahr, Columbia City; Gary L. Comer, Hoagland, both of IN (US)

(73) Assignee: International Truck & Engine Corp, Warrenville ( * ) Notice: Subject to any disclaimer, the term of this patent is extended or adjusted under 35 U.S.C. 154(b) by 0 days.

(21) Appl. No.: 09/441,486

(22) Filed: Nov. 17, 1999

(51) Int. Cl.$^7$ .................................................. B60K 17/28
(52) U.S. Cl. ........................ 307/10.1; 180/53.6; 74/336 R
(58) Field of Search .......................... 307/10.1; 180/53.1, 180/53.6; 74/336 R, 335; 192/220, 220.1

(56) References Cited

U.S. PATENT DOCUMENTS

| | | |
|---|---|---|
| 4,938,302 | 7/1990 | Schott et al. . |
| 5,237,883 | 8/1993 | Churchill et al. . |
| 5,562,173 | 10/1996 | Olson . |
| 6,205,385 * | 3/2001 | Stelzle et al. .................... 180/53.6 |

* cited by examiner

*Primary Examiner*—Josie Ballato
*Assistant Examiner*—Roberto Rios
(74) *Attorney, Agent, or Firm*—Jeffrey Calfa; Dennis Kelly Sullivan; Neil Powell

(57) ABSTRACT

An automotive vehicle has a transmission through which an engine can deliver torque to an axle to propel the vehicle and a transfer case associated with the transmission for operating auxiliary equipment. A system for engaging and disengaging the axle from the transmission and for engaging and disengaging the auxiliary equipment contains a first solenoid (20) that operates to a first state when the vehicle is to be propelled and to a second state when the auxiliary equipment is to be operated and a second solenoid (22) that is selectively operable to a first state that causes the auxiliary equipment to be disengaged from the transmission and to a second state that causes the auxiliary equipment to be engaged with the transmission through the transfer case. A module (26) controls the solenoids and receives a first input (14, 18) for requesting concurrent operation of the solenoids to their respective second states, a second input (16) for signaling transmission output shaft speed, and a third input (24) for signaling full engagement of the auxiliary equipment with the transmission through the transfer case. Once the third input has signaled full engagement of the auxiliary equipment with the transmission through the transfer case, the module prevents both disengagement of the auxiliary equipment from, and engagement of the axle with, the transmission until the second input signals a speed predetermined to be a speed suitable for allowing both disengagement of the auxiliary equipment from, and engagement of the axle with, the transmission.

19 Claims, 2 Drawing Sheets

TRANSFER CASE ENGAGEMENT AND DISENGAGEMENT SYSTEM

FIELD OF THE INVENTION

This invention relates generally to automotive vehicles, typically trucks, that have transfer cases associated with their transmissions for operating auxiliary equipment. More particularly, the invention relates to a system for engaging and disengaging the auxiliary equipment in a manner that reduces the risk of damage to the transfer case, and/or the auxiliary equipment operated through the transfer case, due to premature disengagement of the auxiliary equipment from the transmission through the transfer case.

BACKGROUND AND SUMMARY OF THE INVENTION

A truck powertrain comprises an internal combustion engine that drives road-engaging wheels through a drivetrain. The drivetrain comprises a transmission, a driveshaft, and an axle. The engine is coupled to the input of the transmission, through a clutch in the case of a manual transmission, and the driveshaft couples the transmission output shaft to the axle. The driven wheels are mounted at the ends of the axle.

A truck that has a transfer case associated with its transmission can deliver torque through the transfer case to auxiliary equipment. The auxiliary equipment can assume any of various forms. For example, the transfer case may provide output torque at a power take-off, or PTO, that is coupled to a powerconsuming device such as a hydraulic pump.

For any of various reasons, it may be appropriate for auxiliary equipment to be engaged with and disengaged from a transmission via a transfer case only under certain prevailing conditions. Hence, engagement and/or disengagement may be allowed under some conditions and prohibited under others.

One aspect of the present invention relates to a new and unique electric circuit for allowing engagement and/or disengagement of auxiliary equipment with and/or from a transmission via a transfer case under certain defined conditions and disallowing such engagement and/or disengagement under others.

A presently preferred embodiment of the invention employs electric circuit components connected in a new and unique cooperative association to achieve the desired objectives.

A general aspect of the invention relates to: an automotive vehicle that comprises an engine for powering the vehicle, a drivetrain, including a transmission, through which the engine can deliver torque to road-engaging driven wheels for propelling the vehicle, a transfer case associated with the transmission for operating auxiliary equipment, and a system for engaging and disengaging the wheels from the transmission and for engaging and disengaging the auxiliary equipment with and from the transmission through the transfer case.

The system comprises: a first electric-operated device, such as a first solenoid, that is selectively operable to a first state that causes the driven wheels to be engaged with the transmission and to a second state that causes the driven wheels to be disengaged from the transmission; a second electric-operated device, such as a second solenoid, that is selectively operable to a first state that causes the auxiliary equipment to be disengaged from the transmission and to a second state that causes the auxiliary equipment to be engaged with the transmission through the transfer case; a module for controlling the first and second electric-operated devices; a first input to the module for requesting concurrent operation of the first and second electric-operated devices to their respective second states; a second input to the module for signaling transmission output shaft speed; and a third input to the module for signaling full engagement of the auxiliary equipment with the transmission through the transfer case.

The module comprises a circuit that is effective, once the third input has signaled full engagement of the auxiliary equipment with the transmission through the transfer case, to prevent both disengagement of the auxiliary equipment from, and engagement of the driven wheels with, the transmission until the second input signals a speed predetermined to be a speed suitable for allowing both disengagement of the auxiliary equipment from, and engagement of the driven wheels with, the transmission.

Other general aspects of the invention relate to the system control circuit and to the module circuit.

The foregoing, along with further features and advantages of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figure 1:
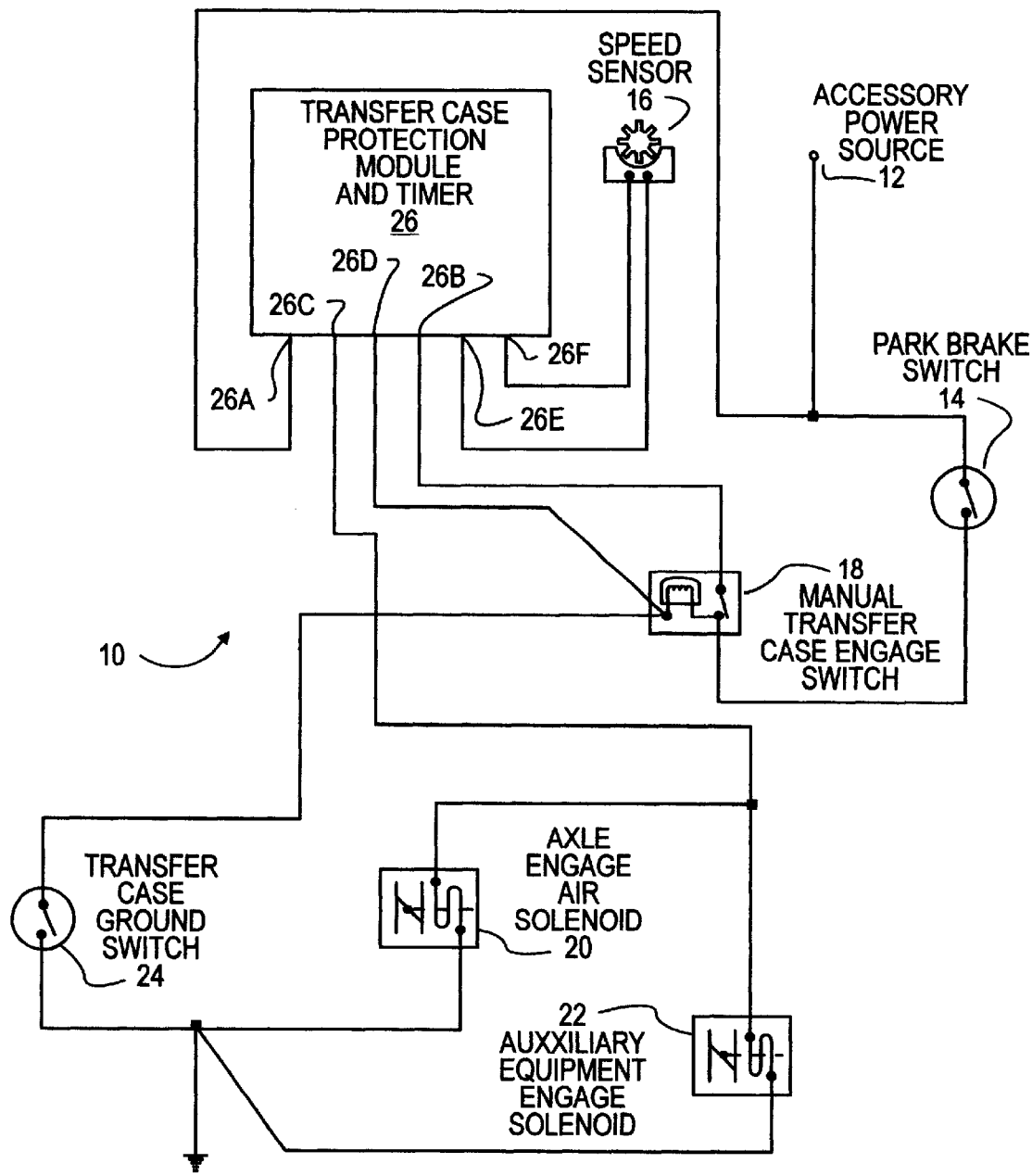
FIG. 1 is an electrical schematic diagram of an exemplary circuit for controlling engagement and disengagement of a transfer case in accordance with principles of the present invention.

FIG. 1 shows an embodiment of the inventive circuit 10 for an automotive vehicle, such as a truck for example, that has an engine, transmission, driveshaft, axle, and transfer case, as described earlier. Circuit 10 utilizes an accessory feed 12 from a switch (not shown) for turning the engine on and off. Circuit 10 also comprises a park brake switch 14 that distinguishes between application and nonapplication of the vehicle park brake. Park brake switch 14 is a normally open switch that closes when the vehicle park brake is applied.

Circuit 10 further comprises a speed sensor, or speed switch, 16, a manual transfer case engage switch 18, an axle engage air solenoid 20, an auxiliary equipment engage solenoid 22, a transfer case ground switch 24, and a transfer case control module 26.

Solenoid 20 controls the application of pressure fluid (compressed air for example) to a device for engaging and disengaging the vehicle axle with and from the transmission. Solenoid 22 controls the application of compressed air to a device for engaging and disengaging the transfer case. Transfer case ground switch 24 is a normally open switch that closes to ground upon the auxiliary equipment operated by the transfer case coming into full engagement with the transmission through the transfer case, and remains closed to ground until full disengagement. Speed sensor 16 provides a signal related to driveshaft speed.

When accessory feed 12 is hot, voltage is delivered to a terminal 26A of transfer case control module 26 and to park brake switch 14. If the vehicle park brake is applied, voltage is passed through to manual transfer case engage switch 18. The latter switch is normally open, but is operated closed by a person desiring to operate the auxiliary equipment. Closing of switch 18 delivers voltage to another terminal 26B of module 26. Hence, for switch 18 to be effective to initiate transfer case engagement, the engine must be on, and the park brake must be applied.

The application of voltage to terminal 26B results in voltage appearing at an output terminal 26C of module 26. Terminal 26C is connected to both solenoids 20 and 22, and so both solenoids are immediately energized. In response, solenoid 20 initiates disengagement of the axle from the transmission, for example by terminating the application of compressed air to the device that was keeping the axle engaged to the transmission, and solenoid 22 initiates engagement of the auxiliary equipment through the transfer case to the transmission, for example by now applying compressed air to the device for engaging the auxiliary equipment to the transmission through the transfer case.

Upon the auxiliary equipment coming into full engagement with the transmission through the transfer case, switch 24 closes to apply a ground to a terminal 26D of module 26. The switch closure also applies a ground to a lamp, or other indicator, associated with switch 18 to disclose the status of the circuit as having successfully engaged the auxiliary equipment. The closure of switch 24 effectively takes control of the circuit away from switches 18 and 14, and accessory feed 12. In other words, the disappearance, for any reason, of the voltage that was applied to terminal 26B to switch in the transfer case and switch out the axle, will be incapable of switching the transfer case out and the axle in. As long as the engine continues to operate and the transmission remains in gear so that its output shaft is rotating, speed sensor 16 outputs a signal to module 26 via module terminals 26E and 26F.

For the auxiliary equipment to be disengaged, the transmission output shaft speed must drop to zero, as sensed by speed sensor 16. When zero speed is sensed, the signal across terminals 26E, 26F disappears. Because a particular speed switch may signal zero speed before the shaft has actually stopped, module 26 contains a circuit, a timer for example, that maintains voltage at terminal 26C for a certain amount of time after the signal from speed sensor 16 first signals zero speed. The additional time, perhaps 15 seconds for example, is sufficient to assure that the shaft has indeed stopped.

If voltage from switch 14 is still present at switch 18, and switch 18 remains closed, the disappearance of the signal from speed sensor 16 will not be effective to remove voltage at terminal 26C. In that event, solenoids 20, 22 remain energized, preventing axle engagement and auxiliary equipment disengagement. It is only both after voltage has been removed from terminal 26B and after the timer of module 26 has timed out that the axle engages and the auxiliary equipment disengages.

Figure 2:
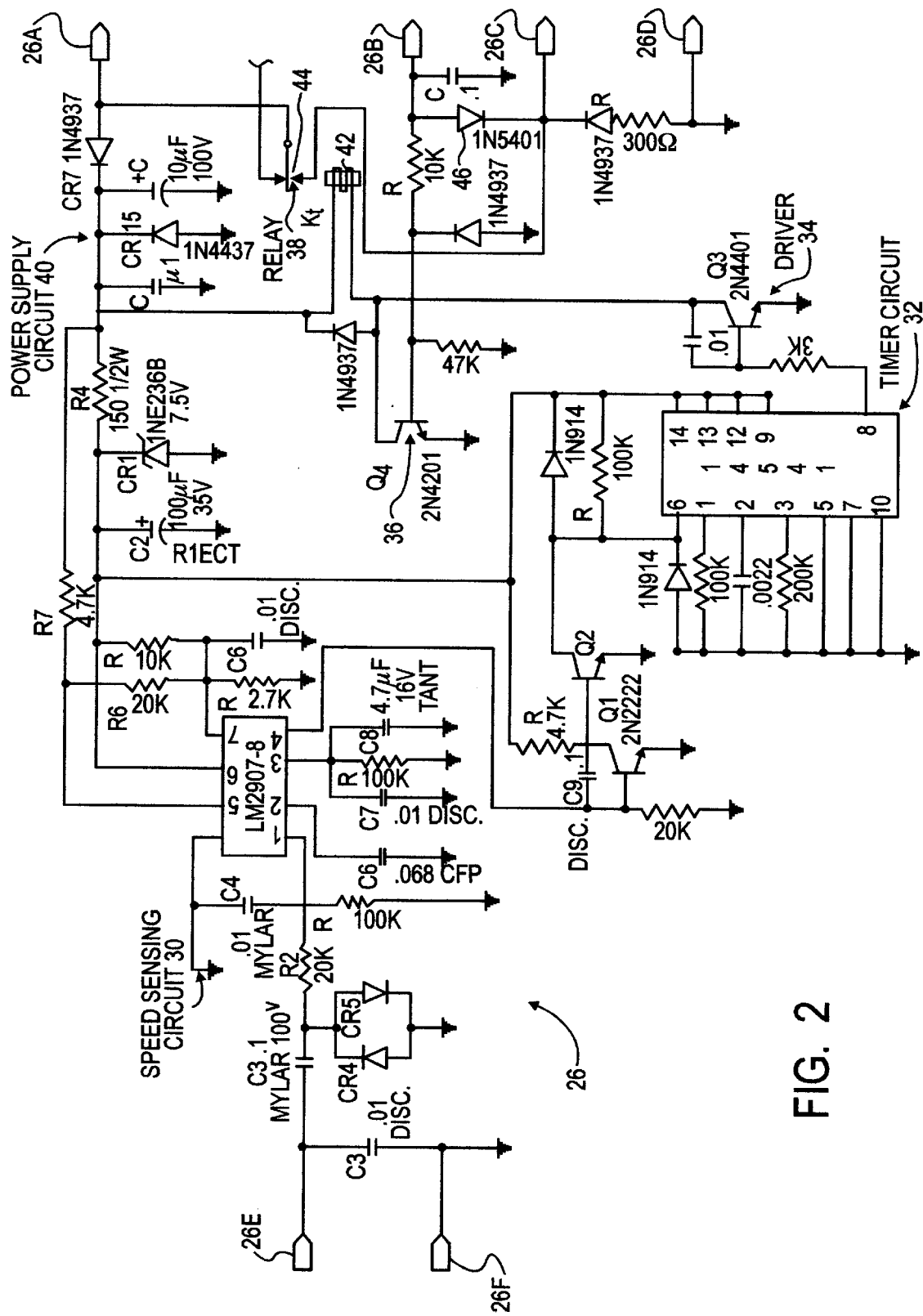
FIG. 2 is an electrical schematic diagram showing more detail of a portion of FIG. 1.

FIG. 2 shows an example of circuitry for transfer case control module 26, including terminals 26A, 26B, 26C, 26D, 26E, and 26F. Module 26 comprises a speed sensing circuit 30, a timer circuit 32, electronic switches 34, 36, a relay 38, and a power supply circuit 40. When the engine on-off switch is on, the vehicle electric system voltage is applied to power supply circuit 40 via terminals 26A, 26D. Circuit 40 develops suitable D.C. voltages for operating various portions of the module circuitry including circuit 30, circuit 32, and relay 38.

Speed sensing circuit 30 comprises an input connected to speed sensor 16 via terminals 26E and 26F. The specific speed sensing circuit 30 shown is a frequency sensing circuit suitable for use with a speed sensor 16 that supplies a signal whose frequency is indicative of the speed of the transmission output shaft, being generally proportional to shaft speed. Circuit 30 operates to distinguish between zero and non-zero shaft speed. It outputs a first signal level when the speed of the transmission output shaft is non-zero, and a second signal level when the shaft speed is zero.

Timer circuit 32 is under the control of circuit 30 and comprises an input that is connected to the output of circuit 30. When the output of circuit 30 is at the first signal level, timer circuit 32 assumes a reset state during which it does not time. When the output of circuit 30 switches from the first signal level to the second signal level, timer circuit 32 begins timing for a preset timing interval, 15 seconds for example. As it times, circuit 32 continues to reside in the reset state, but once the preset timing interval has elapsed, the circuit assumes a set state.

Timer circuit 32 has an output that controls the conductivity of electronic switch 34, or driver, shown as an NPN transistor in this specific embodiment. When timer circuit 32 is in the reset state, it maintains the controlled conductivity path through switch 34 conductive. When timer circuit 32 is in the set state, it maintains the controlled conductivity path through switch 34 non-conductive.

Electronic switch 36, also an NPN transistor in this example, comprises a controlled conduction path in parallel circuit relationship with that of switch 34. The parallel switches 34, 36 are in series circuit relationship with a coil 42 of relay 38. A normally open contact 44 of relay 38 is connected between terminal 26A and terminal 26C.

Terminal 26C is connected to an input circuit for switch 36. A diode 46 is poled to allow current flow from terminal 26B to terminal 26C, but not in the opposite direction. A branch that contains a diode 48 and a resistor 50 in series allows current to flow from terminal 26D to terminal 26C, but not in the opposite direction.

When voltage is applied to terminal 26B by virtue of the closing of switch 18, current flows through diode 46 and terminal 26C to energize solenoids 20 and 22, thereby initiating auxiliary load engagement with the transmission via the transfer case. Upon completion of the engagement, switch 24 closes, applying ground to terminal 26D and hence to all grounded circuits within module 26. The presence of voltage across terminals 26A and 26D thereby energizes power supply circuit 40, and it in turn energizes various circuits within module 26.

Switch 36 becomes conductive, energizing relay coil 42. Contact 44 operates from open to closed, sealing terminal 26C to terminal 26A so that voltage at terminal 26C will be maintained when switch 36 returns to non-conduction when switch 18 goes off.

Circuits 30 and 32 are also energized. The energizing of circuit 32 places the circuit in its reset state, and in that state, switch 34 is conductive. This seals relay coil 42 energized, keeping contact 44 closed. The energizing of circuit 30 allows its output to indicate the status of shaft speed, either zero or non-zero.

As long as the shaft speed is non-zero, circuit 30 forces circuit 32 to stay in the reset state, maintaining voltage at terminal 26C. Solenoids 20 and 22 will de-energize when contact 44 opens, but so long as voltage continues to be applied across terminal 26A, 26D, that contact will open only when switch 18 is off and switch 34 becomes non-conductive.

If switch 18 goes off and sensor 16 continues to sense that the shaft is continuing to rotate, circuit 32 remains in the reset state, causing switch 34 to remain conductive. Whenever circuit 30 senses that the signal from sensor 16 indicates zero speed, it allows circuit 32 to commence timing. As circuit 32 times, it remains in the reset state. Once the preset time interval (15 seconds in this example) elapses, circuit 32 operates from the reset state to the set state, causing switch 36 to switch to non-conduction. Coil 42 is released, and contact 44 opens to terminate the energization of both solenoids 20 and 22.

While a presently preferred embodiment of the invention has been illustrated and described, it should be appreciated that principles of the invention are applicable to all embodiments that fall within the scope of the following claims.

What is claimed is:

1. An automotive vehicle that comprises an engine for powering the vehicle, a drivetrain, including a transmission, through which the engine can deliver torque to road-engaging driven wheels for propelling the vehicle, a transfer case associated with the transmission for operating auxiliary equipment, and a system for engaging and disengaging the wheels from the transmission and for engaging and disengaging the auxiliary equipment from the transmission through the transfer case, the system comprising:

a first electric-operated device that is selectively operable to a first state that causes the driven wheels to be engaged with the transmission and to a second state that causes the driven wheels to be disengaged from the transmission;

a second electric-operated device that is selectively operable to a first state that causes the auxiliary equipment to be disengaged from the transmission and to a second state that causes the auxiliary equipment to be engaged with the transmission;

control circuitry for controlling the first and second electric-operated devices;

a first input to the control circuitry for requesting concurrent operation of the first and second electric-operated devices to their respective second states;

a second input to the control circuitry for signaling transmission output shaft speed;

a third input to the control circuitry for signaling full engagement of the auxiliary equipment with the transmission through the transfer case; and the control circuitry being effective, once the third input has signaled full engagement of the auxiliary equipment with the transmission through the transfer case, to prevent both disengagement of the auxiliary equipment from, and engagement of the driven wheels with, the transmission until the second input signals a speed predetermined to be a speed suitable for allowing both disengagement of the auxiliary equipment from, and engagement of the driven wheels with, the transmission.

2. An automotive vehicle as set forth in claim 1 in which the control circuitry is effective, once the third input has signaled full engagement of the auxiliary equipment with the transmission through the transfer case, to prevent both disengagement of the auxiliary equipment from, and engagement of the driven wheels with, the transmission until the second input signals a speed corresponding to zero speed.

3. An automotive vehicle as set forth in claim 2 in which the control circuitry comprises a timer circuit that begins timing when the second input signals a speed corresponding to zero speed and that allows the first and second electric-operated devices to operate to their respective first states only upon elapse of a certain time interval after it begins timing.

4. An automotive vehicle as set forth in claim 1 in which the control circuitry comprises a timer circuit that begins timing when the second input signals a speed predetermined to be a speed suitable for allowing both disengagement of the auxiliary equipment from, and engagement of the driven wheels with, the transmission and that allows the first and second electric-operated devices to operate to their respective first states only upon elapse of a certain time interval after it begins timing.

5. An automotive vehicle as set forth in claim 1 in which the control circuitry is embodied in a module having respective terminals through which the first, second, and third inputs are supplied.

6. An automotive vehicle as set forth in claim 5 in which the first input is given through an input circuit that contains a command switch for commanding transfer case engagement and a parking brake input for distinguishing between application and non-application of a parking brake of the vehicle, the first input being given when the command switch is actuated to command transfer case engagement and the parking brake input is concurrently indicating application of the parking brake.

7. An automotive vehicle as set forth in claim 6 in which the third input comprises a grounding switch that applies a ground signal to the module for signaling full engagement of the auxiliary equipment with the transmission through the transfer case.

8. A control circuit for use in automotive vehicle that comprises an engine for powering the vehicle, a drivetrain, including a transmission, through which the engine can deliver torque to road-engaging driven wheels for propelling the vehicle, a transfer case associated with the transmission for operating auxiliary equipment, and a system for engaging and disengaging the wheels from the transmission and for engaging and disengaging the auxiliary equipment from the transmission through the transfer case, a first electric-operated device that is selectively operable to a first state that causes the driven wheels to be engaged with the transmission and to a second state that causes the driven wheels to be disengaged from the transmission, and a second electric-operated device that is selectively operable to a first state that causes the auxiliary equipment to be disengaged from the transmission and to a second state that causes the auxiliary equipment to be engaged with the transmission, the control circuit comprising:

a first input for requesting concurrent operation of the first and second electric-operated devices to their respective second states;

a second input for signaling transmission output shaft speed;

a third input for signaling full engagement of the auxiliary equipment with the transmission through the transfer case; and the control circuit being effective, once the third input has signaled full engagement of the auxiliary equipment with the transmission through the transfer case, to prevent both disengagement of the auxiliary equipment from, and engagement of the driven wheels with, the transmission until the second input signals a speed predetermined to be a speed suitable for allowing both disengagement of the auxiliary equipment from, and engagement of the driven wheels with, the transmission.

9. A control circuit as set forth in claim 8 in which the control circuit is effective, once the third input has signaled full engagement of the auxiliary equipment with the transmission through the transfer case, to prevent both disengagement of the auxiliary equipment from, and engagement of the driven wheels with, the transmission until the second input signals a speed corresponding to zero speed.

10. A control circuit as set forth in claim 9 including a timer circuit that begins timing when the second input signals a speed corresponding to zero speed and that allows the first and second electric-operated devices to operate to their respective first states only upon elapse of a certain time interval after it begins timing.

11. A control circuit as set forth in claim 8 in which including a timer circuit that begins timing when the second input signals a speed predetermined to be a speed suitable for allowing both disengagement of the auxiliary equipment from, and engagement of the driven wheels with, the transmission and that allows the first and second electric-operated devices to operate to their respective first states only upon elapse of a certain time interval after it begins timing.

12. A control circuit as set forth in claim 8 in which the control circuit is embodied in a module having respective terminals through which the first, second, and third inputs are supplied.

13. A control circuit as set forth in claim 12 in which the first input is given through an input circuit that contains a command switch for commanding transfer case engagement and a parking brake input for distinguishing between application and non-application of a parking brake of the vehicle, the first input being given when the command switch is actuated to command transfer case engagement and the parking brake input is concurrently indicating application of the parking brake.

14. A control circuit as set forth in claim 13 in which the third input comprises a grounding switch that applies a ground signal to the module for signaling full engagement of the auxiliary equipment with the transmission through the transfer case.

15. A circuit for use in an automotive vehicle that comprises an engine for powering the vehicle, a drivetrain, including a transmission, through which the engine can deliver torque to road-engaging driven wheels for propelling the vehicle, a transfer case associated with the transmission for operating auxiliary equipment, and a system for engaging and disengaging the wheels from the transmission and for engaging and disengaging the auxiliary equipment from the transmission through the transfer case, a first electric-operated device that is selectively operable to a first state that causes the driven wheels to be engaged with the transmission and to a second state that causes the driven wheels to be disengaged from the transmission, and a second electric-operated device that is selectively operable to a first state that causes the auxiliary equipment to be disengaged from the transmission and to a second state that causes the auxiliary equipment to be engaged with the transmission, the circuit comprising:

a first input for receiving a request for concurrent operation of the first and second electric operated devices to their respective second states;

a second input for receiving a speed signal indicating transmission output shaft speed;

a third input for receiving a signal indicating full engagement of the auxiliary equipment with the transmission through the transfer case; and the circuit being effective, once a signal indicating full engagement of the auxiliary equipment with the transmission through the transfer case has been received, to issue a signal preventing both disengagement of the auxiliary equipment from, and engagement of the driven wheels with, the transmission until a speed signal representing a speed suitable for allowing both disengagement of the auxiliary equipment from, and engagement of the driven wheels with, the transmission has been received.

16. A circuit as set forth in claim 15 in which the circuit is effective, once a signal indicating full engagement of the auxiliary equipment with the transmission through the transfer case has been received, to issue a signal preventing both disengagement of the auxiliary equipment from, and engagement of the driven wheels with, the transmission until a speed signal representing zero shaft speed has been received.

17. A circuit as set forth in claim 16 including a timer circuit that begins timing when a speed signal representing zero speed is received and that maintains issuance of the signal preventing both disengagement of the auxiliary equipment from, and engagement of the driven wheels with, the transmission for a certain time interval after the timer circuit begins timing.

18. A circuit as set forth in claim 15 including a timer circuit that begins timing when a speed signal representing a speed predetermined to be a speed suitable for allowing both disengagement of the auxiliary equipment from, and engagement of the driven wheels with, the transmission is received and that maintains issuance of the signal preventing both disengagement of the auxiliary equipment from, and engagement of the driven wheels with, the transmission for a certain time interval after the timer circuit begins timing.

19. A circuit as set forth in claim 15 in which the control circuit is embodied in a module having respective terminals through which the first, second, and third inputs are received.

* * * * *